United States Patent [19]

Sheehan

[11] Patent Number: 4,619,332
[45] Date of Patent: Oct. 28, 1986

[54] CONNECTOR FOR A HELICALLY GROOVED METALLIC CONDUIT

[76] Inventor: Robert K. Sheehan, 571 Rolling Rock La., Cincinnati, Ohio 45230

[21] Appl. No.: 825,689

[22] Filed: Jan. 31, 1986

Related U.S. Application Data

[63] Continuation of Ser. No. 595,331, Mar. 29, 1984.

[51] Int. Cl.[4] ............................................. H02G 3/06
[52] U.S. Cl. .................................. 174/65 R; 285/162
[58] Field of Search .................. 174/65 R, 65 G, 51; 285/158, 162; 248/56; 403/194, 195, 199, 201; 220/62

[56] References Cited

U.S. PATENT DOCUMENTS

| | | |
|---|---|---|
| 1,106,761 | 8/1914 | Weikert et al. . |
| 1,131,399 | 3/1915 | McGinley . |
| 1,215,595 | 2/1917 | Weikert et al. . |
| 2,466,504 | 4/1949 | Stoyer . |
| 2,490,363 | 12/1949 | Lang . |
| 2,869,905 | 1/1959 | Bratz . |
| 2,967,722 | 1/1961 | Lifka . |
| 3,183,297 | 5/1965 | Curtiss . |
| 3,221,572 | 12/1965 | Swick . |
| 3,369,071 | 2/1965 | Tuisku . |
| 3,728,470 | 4/1973 | Maier . |
| 3,746,373 | 7/1973 | Prudente . |
| 3,788,582 | 1/1974 | Swanquist . |
| 3,814,467 | 6/1974 | Van Buren, Jr. . |
| 3,858,151 | 12/1974 | Paskert . |
| 4,012,578 | 3/1977 | Moran et al. . |
| 4,021,604 | 5/1977 | Dola et al. . |
| 4,032,178 | 6/1977 | Neuroth . |
| 4,103,101 | 7/1978 | Maier . |
| 4,156,103 | 5/1979 | Dola et al. ......................... 174/65 R |
| 4,366,344 | 12/1982 | Sheehan . |

*Primary Examiner*—Arthur T. Grimley
*Assistant Examiner*—D. A. Tone
*Attorney, Agent, or Firm*—Wood, Herron & Evans

[57] ABSTRACT

A connector for perpendicularly mounting a helically grooved metallic conduit onto a junction box or the like. the connector is a one-piece metal member with a center ring from which projects two pairs of projections. The first pair form a compressible tubular member adapted to threadably receive the grooved conduit. The other pair form locking wing means to resiliently engage the wall of the conduit box when the connector is inserted into a hole therein.

57 Claims, 5 Drawing Figures

CONNECTOR FOR A HELICALLY GROOVED METALLIC CONDUIT

This application is a continuation, of application Ser. No. 595,331, filed Mar. 29, 1984.

This invention relates to a connector for a helically grooved metallic conduit by which the conduit is secured to a junction box or similar device having a hole in it through which conductors pass for connection to terminals or other conductors.

At the present time, the major portion of the connectors for helically grooved metallic conduits are die cast assemblies. The die cast assembly has several parts. It has a body which is inserted into a hole in a junction box and is threaded so that a nut, on the inside of the junction box, can be threaded onto it to secure it tightly to the junction box wall. It has a cap which, with two screws, is secured to the body member so as to clamp the conduit between the body and the cap.

That connector requires time and some patience to apply. The screws on the cap must be backed substantially all the way out so as to space the body and cap apart a distance sufficient to receive the conduit. Then they must be screwed tightly in to clamp the conduit between the body and the cap. Projecting conductors must then be threaded into the junction box and the nut must be threaded over them and then tightened against the wall of the junction box without a great deal of room in which to maneuver. Not only is the foregoing operation time consuming, it can be very burdensome in situations where the junction box is not easily reached, such as in overhead installations. Further, vibration tends to loosen the nut, in which case the connector may come away from the junction box giving rise to potentially dangerous situations.

Several alternative approaches have been attempted. Many have proposed retaining the threaded body and nut arrangement to connect the connector to the junction box, but have replaced the body, cap, and screw arrangement with a female tubular member to engage the conduit.

In one approach, the conduit is inserted into the tubular member where it is held by compression by means of a screw and bolt arrangement which tightens the tubular member about the conduit. Another approach is to provide inwardly formed threads so that the conduit may be threadably received into the tubular member. Both of the above approaches have the same drawbacks as the die cast assembly due to the threaded body and nut arrangement as previously discussed. With respect to the female tubular member of the compression type, that approach is unsatisfactory as it requires the same manipulation as the die cast part because of the screw and bolt. And as for the threaded version of the female tubular member, it generally fails to hold the conduit firmly within the connector because the grooved conduits currently employed are not manufactured to precise dimensional tolerances. Accordingly, many of the prior art devices including a tubular member into which the conduit is threaded may result in wasted parts because the range over which the diameter of the grooved conduit varies is too great to properly design a female tubular member to receive that conduit.

An alternative is found in U.S. Pat. No. 2,967,722. There, the tubular member is designed as a slotted male member over which the conduit is threadably received. That arrangement, while preferable to the female tubular member, is still disadvantageous in that the slot admits of only a slight variation in the outside diameter of the tubular member. Thus, while the tubular member can compress to adapt more readily to some of the various dimensions of a standard size grooved conduit, it cannot readily receive a wide variety of standard production conduits due to the previously discussed extreme variation in diameter of the conduit. Furthermore, the connector disclosed in the U.S. Pat. No. 2,967,722 still retains the disadvantageous threaded body and nut arrangement. That connector also includes a hinged cover to provide access to the conductors within the conduit. The hinged cover is necessary to permit the operator to install the conductors but increases the cost of production and adds to the time devoted to installation.

Another approach has been to employ a connector having the aforementioned female tubular member with a snap-on feature to snap the connector into the junction box. Examples are disclosed in U.S. Pat. Nos. 3,746,373, 3,814,467, and 3,858,151. All of the foregoing suffer the disadvantages previously associated with the female tubular member. Those devices further suffer because either they are costly and difficult-to-manipulate multi-piece connectors, or are difficult to remove from outside the junction box once inserted. As will be appreciated, when it is necessary to install or remove a connector by working on any part of the connector within the junction box, space in which to work is limited and the risk of injury can increase. Similar problems are present in the connector disclosed in U.S. Pat. No. 4,021,604. There, a one piece metal stamping surrounded by a plastic block is adapted to receive the helical conduit. The assembly has projecting fasteners which are snapped into the opening of the junction box to secure the connector with its conduit to the wall of the junction box. The metal stamping has a hole in one end into which the helical conduit is threaded so as to secure it to the connector. The connector of the U.S. Pat. No. 4,021,604 requires multiple parts and therefore has increased costs. Further, while that connector is quicker to assemble, the engagement of the conduit suffers the same drawbacks as previously discussed when the conduit is threaded into female tubular members as opposed to threaded exteriorly of the tube. Finally, removal must be made by manipulating the connector from the interior of the junction box.

A solution to many of the above problems with regard to a longitudinally applied conduit is disclosed in U.S. Pat. No. 4,366,344. There, a one piece metal stamping is formed in a U-shape presenting three inwardly directed tabs and two barbed fasteners. The conduit is side loaded, or laid into the connector, with the tabs becoming lodged in the helical grooves to prevent longitudinal withdrawal. The fasteners are snapped into a hole in the conduit wall to secure the conduit to the wall. The connector of the U.S. Pat. No. 4,366,344 is inexpensive to manufacture, easy and quick to use, maintains a secure grip in most all sizes of conduit regardless of variations in dimensional tolerances, and can be removed, albeit not easily, from without the junction box. But that connector is useful only when the conduit is to be laid longitudinally along the junction box wall and the connectors bent at a 90° angle to enter into the junction box. When the conduit is perpendicularly applied, as is common, that connector is unable to secure the conduit to the junction box. Were that connector to be so used, the conduit would merely fall away from the junction box. Accordingly, the U.S. Pat. No. 4,366,344 patented connector, while providing the preferable solution to the longitudinal mounting of conduit, provides no solution whatsoever to the perpendicular mounting of conduit to the junction box wall.

Accordingly, the objective of the present invention has been to provide a connector which is an improvement in the prior art connectors for perpendicularly mounting conduit to a junction box wall. A further objective of the present invention has been to provide a connector which is an improvement over prior art connectors in at least the following respects.

(a) The connector is inexpensive to manufacture.

(b) It is easy to apply in the field.

(c) It will accommodate wide variations in the outside dimensions of helical conduit.

(d) It will easily receive a conduit but retain a secure grip thereon.

(e) It is easy to remove from without the junction box.

Additional objects and advantages of the invention will be set forth in part in the description which follows. The objects and the advantages of the invention may be realized and obtained by means of the instrumentalities and combinations particularly pointed out in the appended claims.

These objectives of the invention are attained by providing a connector which is a one piece sheet metal member having a center ring and first and second pairs of projections extending rearwardly from the center ring. The first pair of projections form a compressible tubular member over which helically grooved flexible metal conduit may be received. The second pair of projections forms junction box locking wings for resiliently engaging the wall of the junction box when the center ring has been inserted through the junction box hole. Preferably, the connector includes tabs on the tubular member to prevent the projections forming the tubular member from collapsing and losing the tubular form when compressed to receive the conduit. Also, the connector preferably includes lugs on the tubular members circumferentially and axially spaced to define a helix about which the conduit is threadably received. When provided with such lugs, the above tabs are preferably positioned along the helix so as not to interfere with threadably receiving the conduit while still performing their function of preventing collapse of the tubular member. The tubular member is easily compressed so as to take on the diameter just slightly less than the diameter of a particular conduit being used. The conduit is simply screwed onto the tubular member but once threaded, the tubular member projections are urged toward their original expanded position so as to provide a more certain grip on the interior wall of the conduit.

A portion of the tubular member adjacent the center ring includes a pair of diametrically opposed flat surfaces wherein each of the locking wings overlies a respective flat surface. Each of the pair of locking wings is further provided with stop lugs to block passage of the connector through the junction box hole. The stop lugs and the diametrically opposed flat surfaces cooperate such that when the locking wings engage the flat surfaces, the stop lugs on the locking wing means are prevented from compressing to a dimension smaller than the diameter of the junction box hole. Finally, the locking wings are preferably notched such that when the connector is inserted into the junction box, the wall of the junction box is engaged within the notches on the locking wings to secure the connector in the junction box hole.

The accompanying drawings, which are incorporated and constitute a part of this specification, illustrate a preferred embodiment of the invention and, together with the general description of the invention given above and the detailed description of the preferred embodiments given below, serve to explain the principles of the invention.

Figure 1:
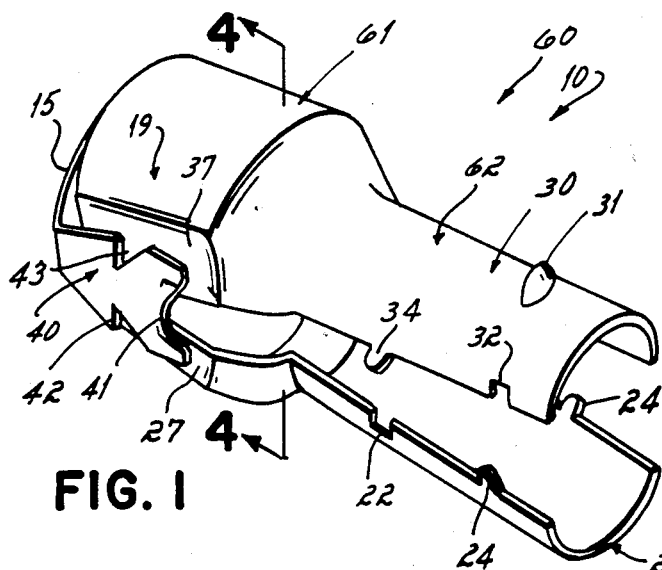
FIG. 1 is a perspective view of the connector of the present invention.

Referring to FIG. 1, the connector of the present invention is indicated at 10 and consists of a sheet metal stamping formed from one piece of sheet metal. In practice, the connector is formed from a ribbon of 1075 spring steel which is fed through a sequence of stamping dies until it attains the configuration of FIG. 1. Connector 10 is shown as a blank stamping in FIG. 3. Connector 10 may be formed by means of a progressive die employing skills commonly held by those in the art.

Figure 3:
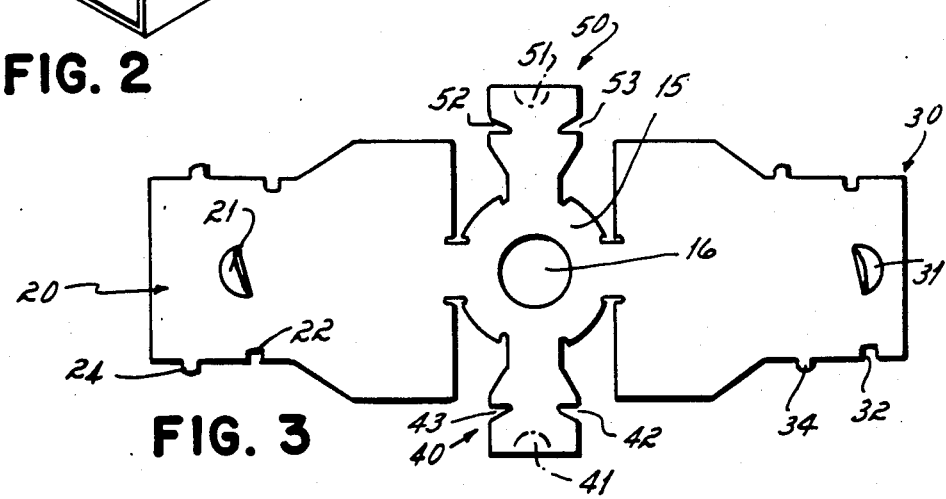
FIG. 3 is a plan view of a flat stamped blank prior to being formed into the connector of the present invention.

As can more easily be seen in FIG. 3, the stamping which makes up connector 10 includes a center ring 15 with a hole 16. Extending to the left of center ring 15 is projection 20 which includes a lug 21, notches 22 spaced toward the far end of projection 20 and tabs 24 located between the far end of projection 20 and the center ring 15. The tabs 24 are bent slightly out of the plane of the blank so that they can lie easily within notches 32 as will appear below. Projecting from the right of center ring 15 is projection 30 which has stamped in it lug 31, and includes tabs 34 and notches 32 similar to tabs 24 and notches 22, respectively, of left projection 20. The purpose of lugs 21 and 31, notches 22 and 32, and tabs 24 and 34, will become apparent.

The pair of projections 20,30 project from opposite quadrants of center ring 15. Similarly, projecting from the two remaining opposite quadrants of center ring 15 are bottom projection 40 and top projection 50. Projections 40 and 50 each include stop lugs 41 and 51, and notches 42 and 52, respectively.

Figure 4:
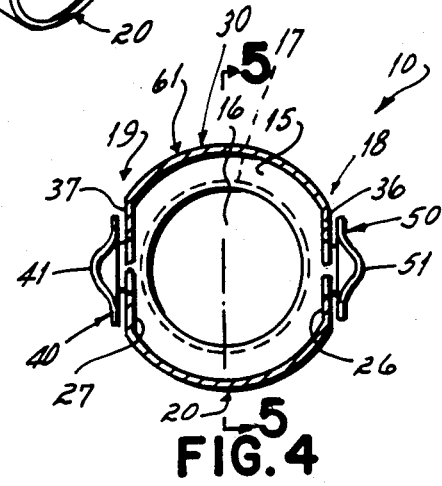
FIG. 4 is a cross-sectional view taken along line 4—4 of FIG. 1.

The final configuration of connector 10 shown in FIG. 1 notably includes the pair of projections 20,30 which have been folded rearwardly from center ring 15 to form a tubular member 60. The second pair of projections 40,50 also project rearwardly of center rings 15 as seen in FIGS. 1 and 4. Also, because connector 10 is preferably spring steel, projections 40,50 are resilient and form locking wings as will be more fully discussed hereafter.

Notches 22 and tabs 34 form cooperating detents as do notches 32 and tabs 24 such that as tubular member 60 is compressed, the tabs lie in the respective notches and thus cooperate to prevent projections 20 and 30 which form tubular member 60 from disengaging along their edges and collapsing, and thus losing tubular form during compression.

As will further be appreciated from FIG. 1, lugs 21 and 31 are circumferentially and axially spaced to define a helix on tubular member 60 to threadably receive helically grooved flexible metal conduit 65 (FIG. 2) thereon. As will further be appreciated from FIG. 1, tabs 24 and 34 are also positioned along the helix formed by lugs 21 and 31. Positioning the tabs along the helix is preferable so that they do not interfere with the threading of conduit 65 onto tubular member 60.

Tubular member 60 is comprised of a larger tubular portion 61 and a smaller tubular portion 62. Tubular portion 61 is adjacent to center ring 15 and has a diameter approximately equal to a standard size hole 72 in a junction box 70 (FIG. 2) into which it is to be fitted. Tubular portion 62 is spaced from center ring 15 and has a minimum diameter (when compressed to receive a conduit) less than the inner diameter 67 of the groove conduit 65 such that the lugs 21 and 31 are spaced apart less than the groove diameter of conduit 65. The groove diameter as used herein means the inner diameter along the projecting grooves 66 of a grooved conduit 65 and not the minimum inner diameter such as at 67.

Commercially available conduit is not made to tight tolerances. Accordingly, a ¼" flexible metal conduit, for example, may have a groove and/or inside diameter that varies substantially from ¼". Hence, it is necessary for tubular portion 62 to be able to receive a particular size of flexible metal conduit regardless of the true diameter. To accomplish that objective, projections 20 and 30, which are of spring steel, are formed with a flare (see FIG. 1) such that they are compressible to a minimum diameter less than the minimum industry-acceptable diameter of flexible metal conduit of a particular size. Since the conduit is simply screwed onto the tubular member, and the tubular member is compressible thereby having a variable diameter, there are no tight tolerance restrictions which must be applied in selecting conduit which may be used with connector 10. Further, the outward force of the spring steel causes the tubular member 62 to engage the inner walls of conduit 65 once it is threaded thereon to provide a more secure threaded connection which is not likely to come loose due to forces such as vibration.

Figure 2:
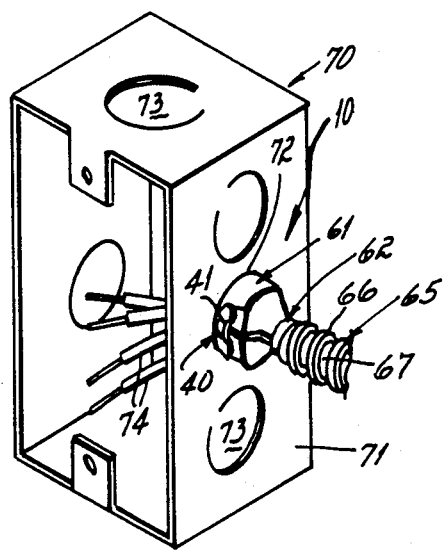
FIG. 2 is a perspective view of the connector of FIG. 1 secured within the hole of a junction box wall and having a helically grooved conduit threadably received thereon.

With reference to FIG. 2, there is shown a junction box 70 having a plurality of knockouts 73 any one of which could be removed to form a standard-sized hole in the junction box 72. Particular reference is made to wall 71 in junction box 70 and hole 72 which has been knocked out therein. Shown in hole 72 is the connector 10 and the grooved conduit 65 threadably received thereon. Also shown within junction box 70 are a plurality of conductors 74 which had been carried through flexible metal conduit 65.

Connector 10 is securely held in hole 72 by locking wings 40 and 50. When inserted, wings 40 and 50 compress to pass into hole 72 and then snap back so as to grip wall 71 within notches 42,52. To provide some room for wings 40 and 50 to compress inwardly, portions of tubular member 61 underlying wings 40 and 50 have been flattened as shown in FIG. 4. Projections 40,50 extend rearwardly (projection 40 shown in FIG. 1) from center ring 15 and overlie flattened portions 26,36 and 27,37, respectively, of tubular member 60. Flattened portion 26 of projection 20 and flattened portion 36 of projection 30 form a first flat surface 18 while flattened portion 27 of projection 20 and flattened portion 37 of projection 30 form a second flat surface 19. Flat surfaces 18 and 19 thus form a pair of diametrically opposed flat surfaces in tubular portion 61. Wings 40 and 50 cooperate with their underlying flat surfaces 18 and 19, respectively, such that wings 40 and 50 engage flat surfaces 18 and 19 preventing stop lugs 41 and 51 from compressing to a dimension smaller than the diameter of junction box hole 72. Thus, stop lugs 41 and 51 on locking wings 40 and 50, respectively, cooperate to prevent passage of connector 10 completely through hole 72 when the connector is first inserted into hole 72.

Figure 5:
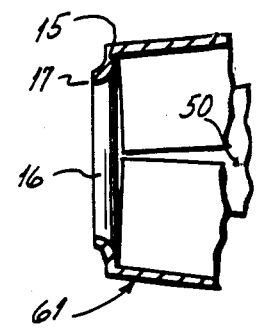
FIG. 5 is a cross-sectional partial view taken along line 5—5 of FIG. 4.

To facilitate ease of insertion of conductor 74 through the tubular member 60 and out through hole 16 in center ring 15, center ring 15 is provided with a forwardly-outturned flange for creating a smooth inner surface (FIG. 5). Outturned flange 17 thus provides a sort of funnel through which conductors can be guided through hole 16 in center ring 15 and can be situated within junction box 70 without any rough abrading edges to damages those conductors 74. Additionally, flange 17 eliminates the need to polish or sand the edges of hole 16 to avoid abrasion of conductors 74.

The use of spring steel prevents the connector 10 from loosening because of any vibration in the equipment to which junction box 70 may be mounted. Also, connector 10 is useful on all helically grooved metal conduits with or without wires (the former commonly known as BX or armored cable) and regardless of the type of conductor 74 which may be housed therein.

In operation, the user need merely compress tubular portion 62 and the grooved conduit 65 thereon. Connector 10 is then inserted forwardly into hole 72 until top lugs 41 and 51 engage wall 72. At that point, the operator need simply discontinue the application of pressure on connector 10 and provide a slight rearward pressure to firmly seat wall 71 within notches 42,43 and 52,53. As discussed, locking wings 40 and 50 are resilient. Hence, removal of connector 10 from junction box wall 71 can be accomplished exteriorly of junction box 70 by gripping stop lugs 41 and 51 as with pliers to apply pressure to squeeze wings 40 and 50 while pulling rearwardly on connector 10.

Additional advantages and modifications will readily occur to those skilled in the art. The invention in its broader aspects is therefore not limited to the specific details, representative apparatus, and illustrative examples shown and described. Accordingly, departures made be made from such details without departing from the spirit or scope of applicant's general inventive concept.

I claim:

1. A connector for mounting a conductor surrounded by a helically grooved metallic conduit to a junction box having a wall and a hole in said wall through which conductors pass, comprising, a one piece sheet metal member, said member having a center ring and having first and second pairs of projections extending rearwardly from said center ring, said first pair of projections extending from two opposite quadrants of said center ring and forming a compressible tubular member over which said grooved conduit may be received, lugs on said tubular member circumferentially and axially spaced to define a helix about which said conduit may be threadably received, detent means on said tubular member for preventing said projections forming said tubular member from collapsing and losing said tubular form during compression, said detent means including at least one tab projecting slightly outwardly from the side of one of said tubular member projections and positioned along said helix, said detent means further including a corresponding notch on the other of said tubular member projections into which said tab can lie, said second pair of projections extending from the remaining two opposite quadrants of said center ring and forming junction box locking wing means for resiliently engaging said wall of said junction box when said center ring is inserted through said hole, stop lugs on said second pair of projections to block passage of said connector through said junction box hole, notches on said second pair of projections to grip said walls of said junction box to secure said connector in said junction box hole after said connector has been inserted therethrough.

2. The connector of claim 1 wherein said center ring includes a forwardly-outturned flange for creating a smooth inner surface.

3. The connector of claim 1 wherein said tubular member includes a first tubular portion adjacent said center ring and having a diameter approximately equal to said hole in said junction box wall, and a second tubular portion spaced from said center ring and having a minimum diameter when compressed approximately equal to the inner diameter of said grooved conduit, said helix-forming lugs and said detent means positioned on said second tubular portion, said first tubular portion having a pair of diametrically opposed flat surfaces, each of said second pair of projections overlying a respective flat surface and wherein engagement of said second pair of projections with said flat surfaces prevents said stop lugs from compressing to a dimension smaller than the diameter of said junction box hole.

4. In combination, an electrical junction box having at least one wall and at least one hole in said wall, a connector resiliently secured to said junction box wall and extending through said junction box hole, a helically grooved metallic conduit threadably engaged over a portion of said connector, said connector comprising a one-piece sheet metal member, said member having a center ring with a forwardly-outturned flange for creating a smooth inner surface, said member further having a first pair of projections extending rearwardly from two opposite quadrants of said center ring to form junction box locking wing means for resiliently engaging said junction box wall, stop lugs on said first pair of projections to block passage of said connector through said junction box hole, notches on said first pair of projections to grip said walls of said junction box to secure said connector in said junction box hole after said connector has been inserted therethrough, said member further having a second pair of projections extending rearwardly from the remaining two opposite quadrants of said center ring to form a compressible tubular member, said tubular member including a first tubular portion adjacent said center ring and having a diameter approximately equal to said junction box hole, said tubular member further having a second tubular portion spaced from said center ring and having a minimum diameter when compressed approximately equal to the inner diameter of said grooved conduit, lugs on said second tubular portion circumferentially and axially spaced to define a helix about which said conduit is threadably received, detent means on said second tubular portion for preventing said projections forming said tubular member from collapsing and losing said tubular form during compression, said detent means including at least one tab projecting slightly outwardly from the side of one of said tubular member projections and positioned along said helix, said detent means further including a corresponding notch on the other of said tubular member projections into which said tab can lie, said first tubular portion having a pair of diametrically opposed flat surfaces, each of said second pair of projections overlying a respective flat surface and wherein the engagement of said second pair of projections with said flat surfaces prevents said stop lugs from compressing to a dimension smaller than the diameter of said junction box hole.

5. A connector for mounting a conductor surrounded by a helically grooved metallic conduit to a junction box having a wall and a hole in said wall through which conductors pass, comprising:

a one-piece sheet metal member;

said member having a center ring and having at least one pair of projections extending rearwardly from said center ring to form a compressible tubular member over which said grooved conduit may be received, said tubular member including detent means for preventing said projections forming said tubular member from collapsing and losing said tubular form during compression; and said member also having junction box locking means for resiliently engaging said wall of said junction box when said center ring is inserted through said hole.

6. The connector of claim 5, said tubular member having (i) a first tubular portion adjacent said center ring and having a first predetermined diameter approximately equal to said hole in said junction box wall, and (ii) a second tubular portion including said detent means and spaced from said center ring and having a minimum second diameter when compressed less than an inner diameter of said grooved conduit.

7. The connector of claim 6, said detent means including at least one tab projecting slightly outwardly from the side of one of said projections and a corresponding notch on the other of said projections into which said tab can lie.

8. The connector of claim 5, said detent means including at least one tab projecting slightly outwardly from the side of one of said projections and a corresponding notch on the other of said projections into which said tab can lie.

9. A connector for mounting a conductor surrounded by a helically grooved metallic conduit to a junction box having a wall and a hole in said wall through which conductors pass, comprising a one-piece sheet metal member;

said member having a center ring and having at least one pair of projections extending rearwardly from said center ring to form a compressible tubular member over which said grooved conduit may be received, said tubular member including a pair of lugs circumferentially and axially spaced to define a helix about which said conduit may be threadably received;

said member also having junction box locking means for resiliently engaging said wall of said junction box when said center ring is inserted through said hole.

10. The connector of claim 9, said tubular member including detent means for preventing said projections forming said tubular member from collapsing and losing said tubular form during compression.

11. The connector of claim 10, said detent means including at least one tab projecting slightly outwardly from the side of one of said projections and a corresponding notch on the other of said projections into which said tab can lie.

12. The connector of claim 9, said tubular member (i) having a first tubular portion adjacent said center ring and having a first predetermined diameter approximately equal to said hole in said junction box wall, and (ii) a second tubular portion including said lugs and spaced from said center ring and having a minimum second diameter when compressed less than an inner diameter of said grooved conduit.

13. The connector of claim 12, said second tubular portion including detent means for preventing said projections forming said tubular member from collapsing and losing said tubular form during compression.

14. The connector of claim 13, said detent means including at least one tab projecting slightly outwardly from the side of one of said projections and a corresponding notch on the other of said projections into which said tab can lie.

15. a connector for mounting a conductor surrounded by a helically grooved metallic conduit to a junction box having a wall and a hole in said wall through which conductors pass, comprising
a one-piece sheet metal member;
said member having a center ring and having at least one pair of projections extending rearwardly from said center ring to form a compressible tubular member over which said grooved conduit may be received;
said member also having junction box locking means for resiliently engaging said wall of such junction box when said center ring is inserted through said hole, said locking means including notch means for securing the connector in said junction box hole after the connector has been seated within said hole in said wall.

16. The connector of claim 15, said tubular member including detent means for preventing said projections forming said tubular member from collapsing and losing said tubular form during compression.

17. The connector of claim 16, said detent means including at least one tab projecting slightly outwardly from the side of one of said projections and a corresponding notch on the other of said projections into which said tab can lie.

18. The connector of claim 16, said tubular member including a pair of lugs circumferentially and axially spaced to define a helix about which said conduit is threadably received.

19. The connector of claim 15, said tubular member including a pair of lugs circumferentially and axially spaced to define a helix about which said conduit is threadably received.

20. A connector for mounting a conductor surrounded by a helically grooved metallic conduit to a junction box having a wall and a hole in said wall through which conductors pass, comprising:
a one-piece sheet metal member,
said member having a center ring and having first and second pairs of projections extending rearwardly from said center ring,
said first pair of projections forming a compressible tubular member over which said grooved conduit may be received, said tubular member including detent means for preventing said projections forming said tubular member from collapsing and losing said tubular form during compression,
said second pair of projections forming junction box locking wing means for resiliently engaging said wall of said junction box when said center ring is inserted through said hole.

21. The connector of claim 20, said detent means including at least one tab projecting slightly outwardly from the side of one of said projections and a corresponding notch on the other of said projections into which said tab can lie.

22. The connector of claim 20 wherein said first pair of projections extend from two opposite quadrants of said center ring.

23. The connector of claim 22 wherein said second pair of projections extend from the remaining two opposite quadrants of said center ring.

24. The connector of claim 20, said junction box locking wing means including stop means for preventing said connector from being pushed completely through said hole in said wall.

25. The connector of claim 24 wherein said junction box locking wing means include notches along the respective sides of each of said second pair of projections for securing the connector in said junction box hole after the connector has been seated within said hole in said wall.

26. The connector of claim 20, said tubular member having (i) a first tubular portion adjacent said center ring and having a first predetermined diameter approximately equal to said hole in said junction box wall, and (ii) a second tubular portion including said detent means and spaced from said center ring and having a minimum second diameter when compressed less than an inner diameter of said grooved conduit.

27. The connector of claim 24, said detent means including at least one tab projecting slightly outwardly from the side of one of said projections and a corresponding notch on the other of said projections in to which said tab can lie.

28. The connector of claim 24 wherein said first pair of projections extend from two opposite quadrants of said center ring, and said second pair of projections extend from the remaining two opposite quadrants of said center ring.

29. The connector of claim 24,
said first tubular portion having a pair of diametrically opposed flat surfaces,
each of said second pair of projections overlying a respective said flat surface.

30. The connector of claim 29 further comprising lugs on said second pair of projections to block passage of said connector through a junction box hole,
engagement of said second pair of projections with said flat surfaces preventing said lugs from compressing to a dimension smaller than the diameter of said junction box hole.

31. The connector of claim 30 further comprising notches on said second pair of projections to grip said wall of said junction box to secure said connector in said junction box hole after said connector has been inserted therethrough.

32. The connector of claim 20 wherein said center ring includes a forwardly-outturned flange for creating a smooth inner surface.

33. A connector for mounting a conductor surrounded by helically grooved metallic conduit to a junction box having a wall and a hole in said wall through which conductors pass, comprising,
a one-piece sheet metal member,
said member having a center ring and having first and second pairs of projections extending rearwardly from said center ring,
said first pair of projections forming a compressible tubular member over which said grooved conduit may be received, said tubular member including a pair of lugs circumferentially and axially spaced to define a helix about which said conduit may be threadably received,
said second pair of projections forming junction box locking wing means for resiliently engaging said wall of said junction box when said center ring is inserted through said hole.

34. The connector of claim 33 wherein said first pair of projections extend from two opposite quadrants of said center ring.

35. The connector claim 34 wherein said second pair of projections extend from the remaining two opposite quadrants of said center ring.

36. The connector of claim 33, said tubular member including detent means for preventing said projections forming said tubular member from collapsing and losing said tubular form during compression.

37. The connector of claim 36, said detent means including at least one tab projecting slightly outwardly from the side of one of said projections and a corresponding notch on the other of said projections into which said tab can lie.

38. The connector of claim 33, said junction box locking wing means including stop means for preventing said connector from being pushed completely through said hole in said wall.

39. The connector of claim 38 wherein said junction box locking wing means include notches along the respective sides of each of said second pair of projections for securing the connector in said junction box hole after the connector has been seated within said hole in said wall.

40. The connector of claim 39, said tubular member including detent means for preventing said projections forming said tubular member from collapsing and losing said tubular form during compression.

41. The connector of claim 40, said detent means including at least one tab projecting slightly outwardly from the side of one of said projections and a corresponding notch on the other of said projections into which said tab can lie.

42. The connector of claim 33, said tubular member having (i) a first tubular portion adjacent said center ring and having a first predetermined diameter approximately equal to said hole in said junction box wall, and (ii) a second tubular portion including said lugs and spaced from said center ring and having a minimum second diameter when compressed less than an inner diameter of said grooved conduit.

43. The connector claim 42, said second tubular portion including detent means for preventing said projections forming said tubular member from collapsing and losing said tubular form during compression.

44. The connector of claim 43, said detent means including at least one tab projecting slightly outwardly from the side of one of said projections and a corresponding notch on the other of said projections into which said tab can lie.

45. The connector of claim 33,
said first tubular portion having a pair of diametrically opposed flat surfaces,
each of said second pair of projections overlying a respective said flat surface.

46. The connector of claim 45 further comprising stop lugs on said second pair of projections to block passage of said connector through a junction box hole,
engagement of said second pair of projections with said flat surfaces preventing said stop lugs from compressing to a dimension smaller than the diameter of said junction box hole.

47. The connector of claim 46 further comprising notches on said second pair of projections to grip said wall of said junction box to secure said connector in said junction box hole after said connector has been inserted therethrough.

48. The connector of claim 33 wherein said center ring includes a forwardly-outturned flange for creating a smooth inner surface.

49. A connector for mounting a conductor surrounded by a helically grooved metallic conduit to a junction box having a wall and a hole in said wall through which conductors pass, comprising:
a one-piece sheet metal member,
said member having a center ring and having first and second pairs of projections extending rearwardly from said center ring,
said first pair of projections forming a compressible tubular member over which said grooved conduit may be received,
said second pair of projections forming junction box locking wing means for resiliently engaging said wall of said junction box when said center ring is inserted through said hole, said junction box locking wing means including notches along the respective sides of each of said second pair of projections for securing the connector in said junction box hole after the connector has been seated within said hole in said wall.

50. The connector of claim 49, said junction box locking wing means including stop means for preventing said connector from being pushed completely through said hole in said wall.

51. A connector for mounting a conductor surrounded by a helically grooved metallic conduit to a junction box having a wall and a hole in said wall through which conductors pass, comprising:
a one-piece sheet metal member,
said member having a center ring and having at least one pair of projections extending rearwardly from two opposite quadrants of said center ring to form a compressible tubular member over which said grooved conduit may be received, lugs on said tubular member circumferentially and axially spaced to define a helix about which said conduit may be threadably received, detent means on said tubular member for preventing said projections forming said tubular member from collapsing and losing said tubular form during compression, said detent means including at least one tab projecting slightly outwardly from the side of one of said tubular member projections and positioned along said helix, said detent means further including a corresponding notch on the other of said tubular member projections into which said tab can lie, junction box locking means for resiliently engaging said wall of said junction box when said center ring is inserted through said hole, said junction box locking means including stop lugs to prevent the connector from being pushed completely through said junction box hole and notch means for securing the connector in said junction box hole after the connector has been inserted partially therethrough.

52. The connector of claim 51 wherein said center ring includes a forwardly-outturned flange for creating a smooth inner surface.

53. The connector of claim 52 wherein said tubular member includes (i) a first tubular portion adjacent said center ring and having a first predetermined diameter approximately equal to said hole in said junction box wall, and (ii) a second tubular portion spaced from said center ring and having a minimum second diameter when compressed approximately equal to the inner diameter of said grooved conduit, said helix-forming lugs and said detent means positioned on said second tubular portion.

54. A connector for mounting a conductor surrounded by a helically grooved metallic conduit to a junction box having a wall and a hole in said wall through which conductors pass, comprising, a one-piece sheet metal member, said member having a center ring and having first and second pairs of projections extending rearwardly from said center ring, said first pair of projections forming a compressible tubular member over which said grooved conduit may be received, said tubular member having (i) a first tubular portion adjacent said center ring and having a first predetermined diameter approximately equal to said hole in said junction box wall, and (ii) a second tubular portion spaced from said center ring and having a minimum second diameter when compressed less than an inner diameter of said grooved conduit, said second pair of projections forming junction box locking wing means for resiliently engaging said wall of said junction box when said center ring is inserted through said hole, said first tubular portion having a pair of diametrically opposed flat surfaces, each of said second pair of projections overlying a respective said flat surface.

55. The connector of claim 54 further comprising stop lugs on said second pair of projections to block passage of said connector through a junction box hole, engagement of said second pair of projections with said flat surfaces preventing said stop lugs from compressing to a dimension smaller than the diameter of said junction box hole.

56. The connector of claim 55 further comprising notches on said second pair of projections to grip said wall of said junction box to secure said connector in said junction box hole after said connector has been inserted therethrough.

57. In combination, an electrical junction box having at least one wall and at least one hole in said wall, a connector resiliently secured to said junction box wall and extending partially through said junction box hole, a helically grooved metallic conduit threadably engaged over a portion of said connector, said connector comprising a one-piece sheet metal member, said member having a center ring with a forwardly-outturned flange for creating a smoother inner surface, said member having at least one pair of projections extending rearwardly from two opposite quadrants of said center ring to form a compressible tubular member, said tubular member including a first tubular portion adjacent said center ring and having a first predetermined diameter approximately equal to said junction box hole, said tubular member further having a second tubular portion spaced from said center ring and having a minimum second diameter when compressed approximately equal to the inner diameter of said grooved conduit, lugs on said second tubular portion circumferentially and axially spaced to define a helix about which said conduit is threadably received, detent means on said second tubular portion for preventing said projections forming said tubular member from collapsing and losing said tubular form during compression, said detent means including at least one tab projecting slightly outwardly from the side of one of said tubular member projections and positioned along said helix, said detent means further including a corresponding notch on the other of said tubular member projections into which said tab can lie, said member further having junction box locking means for resiliently engaging said junction box wall, said junction box locking means including stop lugs to prevent the connector from being pushed completely through said junction box hole and notch means for securing the connector in said junction box hole after the connector has been inserted partially therethrough.

* * * * *